S. D. BENOLIEL.
SAW FILING AND SETTING MACHINE.
APPLICATION FILED MAY 31, 1904.

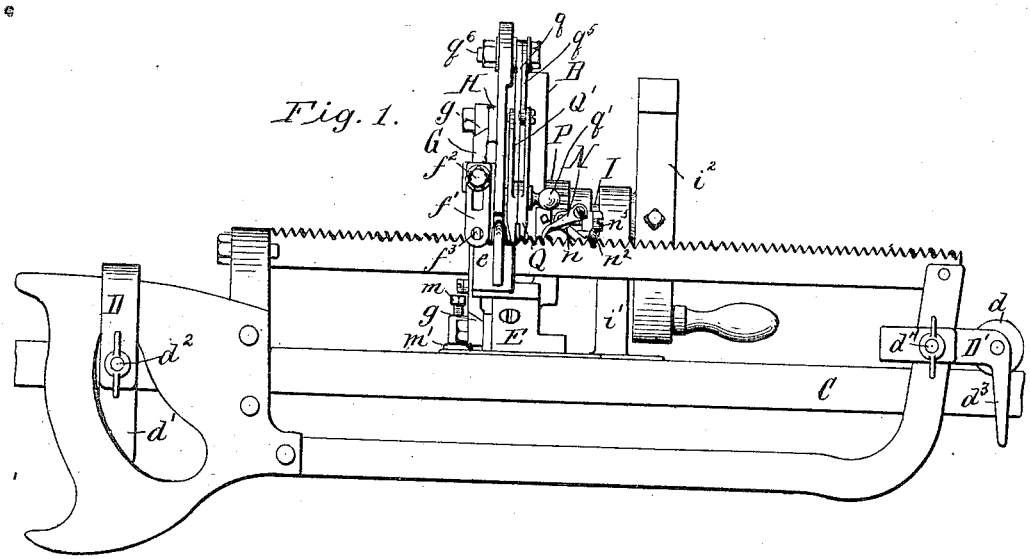

971,718.

Patented Oct. 4, 1910.
3 SHEETS—SHEET 2.

Witnesses:—
R. W. Rimmer
E. A. Volk.

Inventor
S. D. Benoliel.
by Wilhelm, Parker & Haid,
Attorneys.

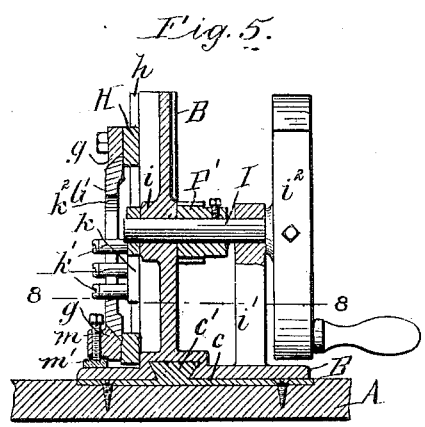
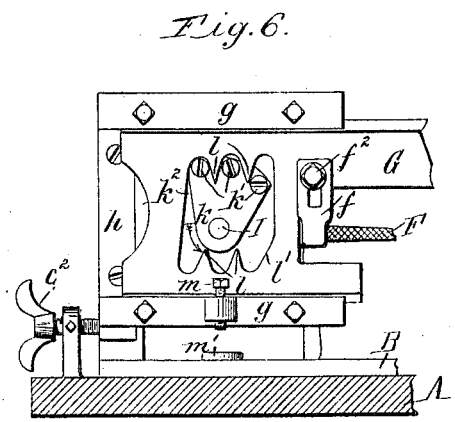
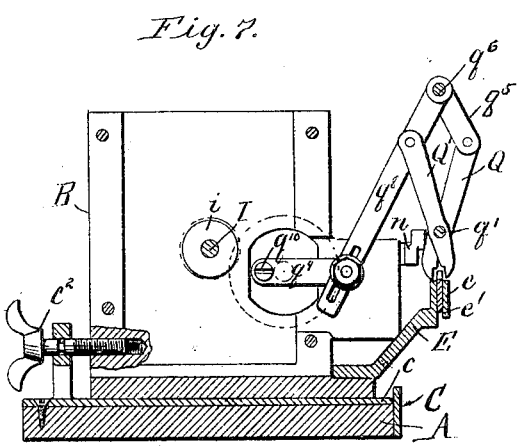
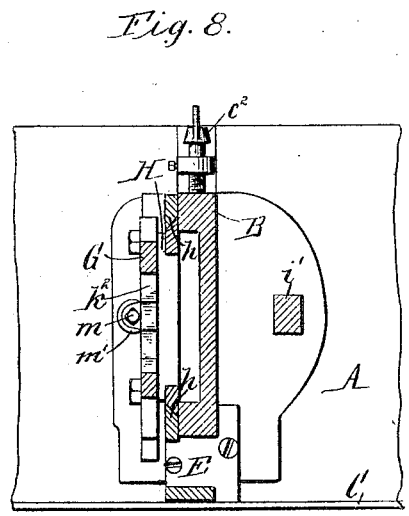
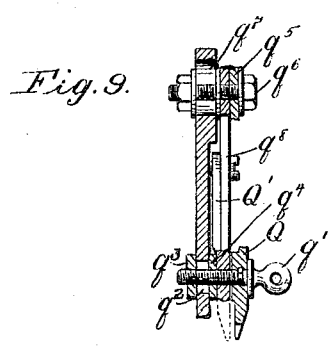
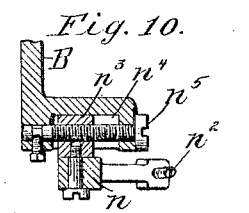

UNITED STATES PATENT OFFICE.

SOLOMON D. BENOLIEL, OF NIAGARA FALLS, NEW YORK.

SAW FILING AND SETTING MACHINE.

971,718.      Specification of Letters Patent.      Patented Oct. 4, 1910.

Application filed May 31, 1904. Serial No. 210,333.

*To all whom it may concern:*

Be it known that I, SOLOMON D. BENOLIEL, a citizen of the United States, residing at Niagara Falls, in the county of Niagara, in the State of New York, have invented new and useful Improvements in Saw Filing and Setting Machines, of which the following is a specification.

This invention relates to saw filing and setting machines in which the saw is mounted to travel horizontally on a track and is moved intermittently by suitable mechanism past the tooth filing and setting mechanisms which operate respectively to file a tooth at each rest period of the saw and set two adjacent teeth simultaneously to opposite sides of the plane of the saw blade at each alternate rest period of the saw.

The primary object of the invention is to produce a rapid efficient machine of this character which is of simple, strong and practical construction.

Other objects of the invention are to improve such a machine in several respects which will appear from the following specification.

Figure 3:
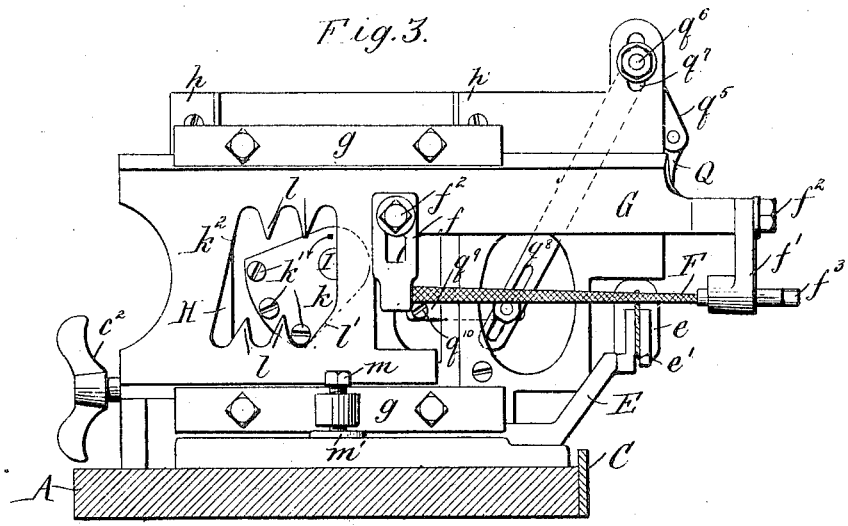
Figure 4:
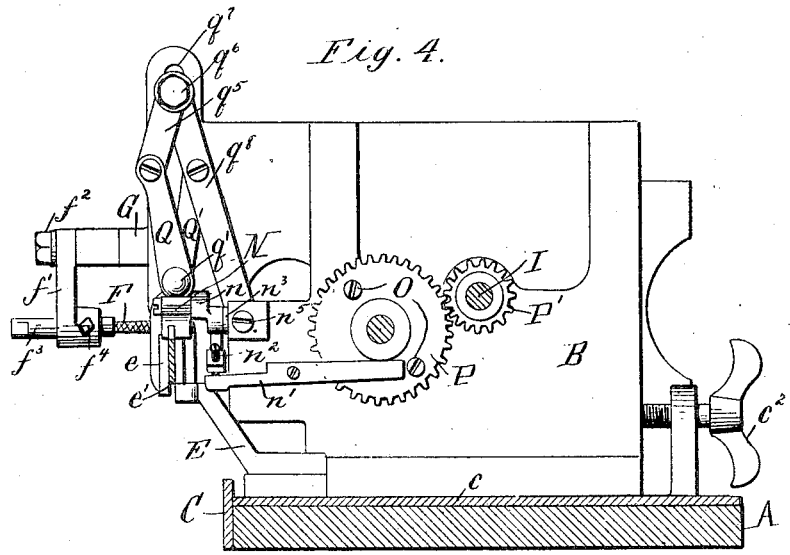

In the accompanying drawings consisting of three sheets: Figure 1 is a front elevation of a saw filing and setting machine embodying the invention. Fig. 2 is a plan view thereof. Fig. 3 is an elevation, partly in section, on an enlarged scale, of one end thereof. Fig. 4 is an elevation partly in section, on an enlarged scale, of the other end thereof. Fig. 5 is a longitudinal sectional elevation in line 5—5, Fig. 2. Fig. 6 is a fragmentary end elevation partly in section of the file carrier and operating mechanism, showing the position of the parts when the carrier is lifted and moving rearwardly. Fig. 7 is a sectional elevation in line 7—7, Fig. 2, showing the tooth setting mechanism. Fig. 8 is a fragmentary horizontal section partly in plan in line 8—8, Fig. 5. Fig. 9 is a fragmentary sectional elevation of the tooth setting mechanism. Fig. 10 is a detail horizontal section showing the adjustable support for the saw feed dog.

Like letters of reference refer to like parts in the several figures.

A represents a base, portable base board or other suitable support for the machine, and B a main frame which is mounted on the base and consists of an upright portion or standard and a foot portion. In the machine illustrated the base is provided at or near its front edge with a track C formed by a metal bar or strip secured in any convenient manner to the base. On this track travels a carriage or movable support for the saw. The main frame is adjustable horizontally toward and from the track so that the operative parts of the machine can be moved into proper relation to blades of different saws placed on the carriage. For this purpose the frame slides on a base plate $c$ having a guide rib $c^1$ entering a groove in the foot of the frame. The frame is moved and held in adjusted positions by an adjusting screw $c^2$.

The saw carriage or support is removably placed on the track and may be of any suitable construction adapting it to be readily secured to the saw to be sharpened. A skeleton saw is illustrated and a support or carriage designed for attachment to such a saw, but the machine is adapted for operation upon other kinds of saws, and supports adapted for saws of different character can be employed in place of the support shown. The saw carriage or support illustrated in the drawings consists of separate clamps D D$^1$ secured to the ends of the saw at opposite sides of the main frame and each provided with a grooved roller $d$ which travels on the stationary track. The clamp D which is secured to the handle-end of the saw is provided with an upright portion $d^1$ which bears against the front face of the track to hold the saw vertical, and with a hooked upper end which straddles the upper portion of the handle to which it is secured by a thumb screw $d^2$. The clamp D$^1$ for the other end of the saw also has an upright portion $d^3$ which bears against the front face of the track, and a horizontal hooked arm which embraces the end of the saw frame, to which it is secured by a thumb screw $d^4$.

The saw blade is held rigidly against lateral flexure adjacent to the filing and setting devices by suitable means, which in the form shown in the drawings consists of an arm E secured to and projecting upwardly from the foot of the main frame and having a head or upper end $e$ which is provided with a downwardly opening vertical slot $e^1$ in which the saw blade slidably engages. The top of the head $e$ is recessed or notched at opposite sides, see Fig. 1, to allow the file and setting device to engage the saw teeth. This holding device is very simple and the saw is quickly engaged therewith by slipping the blade up into the holding slot before the rollers of the saw support are engaged on their track. Holding devices, or a single holding device, of any other suitable construction can be employed in place of that described, and, like the saw support or carriage, will vary to accommodate different types of saws.

The file, which is shown at F, Figs. 3 and 4, is arranged transversely over the saw blade and is removably secured at its opposite ends in suitable clamps or holders $f$ $f^1$ secured to a reciprocating file carrier G, see Figs. 1, 2 and 3. Each file holder is secured to the file carrier so as to be vertically adjustable thereon by bolts $f^2$ passing through vertical slots in the file holders and entering threaded holes in the file carrier. The file holder $f$ is provided with a socket in which the heel of the file is inserted and the other holder $f^1$ is provided with a horizontal hole in which a movable socket piece $f^3$ is fitted. The socket piece is provided in its inner end with a socket for the toe of the file and is longitudinally and rotatably adjustable in the holder. It is fixed after adjustment by a set screw or the like $f^4$, Figs. 2 and 4.

The upper and lower horizontal edges of the file carrier slidably engage in suitable horizontal ways $g$, Figs. 1, 3 and 5, formed on a vertically reciprocating support or slide head H, the front and rear vertical edges of which engage and slide vertically in suitable ways $h$, Figs. 2, 5 and 8, of corresponding shape provided on the main frame of the machine.

The file carrier is operated by the following mechanism: I represents a drive shaft which is arranged horizontally in a suitable bearing $i$ on the upright portion of the main frame and a bearing in a pedestal $i^1$ rising from the foot of the main frame. The shaft is driven by suitable means, for instance, in the construction shown, it is provided at its outer end with a counterweighted hand crank $i^2$. The other end of the drive shaft adjacent to the file carrier is provided with a crank arm or plate $k$ having teeth $k^1$, preferably formed by studs provided with anti-friction rollers. The crank arm and teeth pass through a hole in the slide head H and the teeth extend into an opening $k^2$ in the file carrier, which opening has oppositely disposed teeth $l$ at its upper and lower sides and a front inclined face $l^a$, see Fig. 3. When the drive shaft is rotated to the right as indicated by the arrows in Figs. 3 and 6, the foremost tooth $k^1$ on the arm engages the front inclined face $l^1$ of the opening in the file carrier and the several teeth of the crank arm successively engage the teeth at the lower side of the opening thus moving the file carrier forwardly with the file in operative engagement with the tooth of the saw. The first tooth on the crank arm engages between the last tooth at the upper side of the hole in the file carrier and the rear edge of the hole and lifts the file carrier and the vertically reciprocating head supporting the same, the teeth of the crank then engaging the several teeth at the top of the opening and moving the file carrier rearwardly with the file out of contact with the saw teeth, after which the teeth on the arm again engage the inclined face $l^1$ and teeth at the lower side of the opening in the file carrier to lower and again move the file carrier forwardly. The action is thus to move the file forwardly in operative engagement with the teeth of the saw, and then lift the file and return it while out of engagement with the saw teeth. In order to lessen the noise and jar in the operation of the machine the vertically reciprocating head for the file carrier is provided with an adjustable stop screw or device $m$, Figs. 3, 5 and 6, which engages a yielding buffer or cushion $m^1$ secured on the foot of the main frame.

The saw is moved intermittently forward by feed mechanism preferably constructed as follows: N, Figs. 1, 2 and 4, represents a pivoted pawl or dog arranged over the saw blade and provided with a reduced lower end or nose which engages with the teeth of the saw. The pawl is hung on a pivot on the upper arm of a bent lever $n$ which is pivoted intermediate of its ends on the front of the upright portion of the main frame and has a weighted arm projecting over the front end of an operating lever $n^1$, Figs. 2 and 4, which is pivoted intermediate of its ends on the side of the upright portion of the main frame. The weighted arm of the pawl lever carries an adjustable screw $n^2$ which is engaged by the operating lever $n^1$ to operate the pawl lever. The throw of the pawl lever is regulated as required by saw teeth of different sizes by adjusting the screw $n^2$. To enable adjustment of the feed pawl lengthwise of the saw to insure the proper relation between the pawl and the file so that the saw teeth are moved into exactly correct position for filing and setting, the pivot of the pawl lever $n$ is carried by a block $n^3$, Fig. 10, slidably fitted in a guide $n^4$ in the upright portion of the main frame. The block is adjusted toward and from the file by a screw $n^5$ which is held from endwise movement on the frame and works in a threaded hole in the block. The rear end of the operating lever $n^1$ for the pawl lever is engaged and rocked on its pivot by two studs or pins O secured to and projecting from the face of a gear wheel P at diametrically opposite sides thereof. The lateral arm of the pawl lever $n$ is preferably weighted so that the rear end of the operating lever $n^1$ is lifted in proper position to be actuated by the pins on the gear wheel. The gear wheel is journaled on a stud shaft or axle projecting from the upright portion of the main frame and meshes with and is driven by a gear wheel $P^1$ secured to the drive shaft. The gear wheels P and $P^1$ are so proportioned that the former makes one revolution for two revolutions of the latter and the pins are so arranged relative to the file operating mechanism that one of the pins engages the operating lever for the pawl and actuates the pawl to move the saw forward one step, or a distance equal to the length of one tooth, each time the file is raised and retracted, so that the file, engages and sharpens a new tooth at each forward reciprocation.

The setting mechanism is constructed as follows: See Figs. 1 to 4, 7 and 9. Q $Q^1$ represent two setting levers which are arranged over the saw blade and fulcrumed intermediate of their ends on a pivot or pin $q^1$ mounted on the upright portion of the main frame, and are provided at their lower ends with setting jaws which normally occupy positions on opposite sides of two contiguous teeth of the saw when the latter is stationary. The pivot pin for the setting levers passes through and is adjustable vertically in a slot $q^2$ in the frame in which slot it is secured in adjusted positions by holding nuts $q^3$ $q^4$ screwed thereon on opposite sides of the frame. The setting levers can thus be adjusted vertically relative to the saw teeth, and can be lifted and secured in a position in which they will be inactive, when it is desired to file the teeth without setting them. The pivot pin is held from endwise movement in one setting lever and has a threaded engagement with the other setting lever, so that by loosening the holding nuts and turning the pin the setting jaws can be separated more or less to properly operate upon teeth of different widths. The pivot pin can be turned by any suitable tool. After thus adjusting the setting levers relative to each other, both levers with their pivot pins can be adjusted toward or from the file, so that after the file has been properly adjusted relative to the saw teeth, the setting jaws can be adjusted with reference to the file and teeth. The setting lever Q is pivoted at its upper end to the lower end of a link $q^5$ which is pivoted at its upper end on a bolt or pin $q^6$ which slides in a vertical slot $q^7$ in the upright portion of the main frame. The other setting lever $Q^1$ is pivoted at its upper end to an operating lever $q^8$ which is pivoted at its upper end on the sliding pin $q^6$ and is connected at its lower end by a link $q^9$ with a crank $q^{10}$ on the gear wheel P. The link $q^9$ and operating lever $q^8$ are adjustably connected, as by a pin and slot connection to allow the operating lever to be adjusted to effect a greater or less movement of the setting levers, thereby regulating, as required, the amount of set given to the saw teeth. This construction also permits the vertical adjustments of the setting levers, as before explained. The amount of movement of the setting levers can be varied by other means. The setting levers are operated once to engage and set two adjacent teeth simultaneously to opposite sides of the plane of the saw blade for each two revolutions of the drive shaft. Thus the file is operated and sharpens two teeth for each operation of the setting levers and two teeth are moved away from the setting levers and the next two teeth properly presented thereto between successive operations of the setting levers.

From the above description it will be apparent that the filing and setting mechanisms can be adjusted laterally relative to the saw blade, the file can be properly set to sharpen the teeth, the setting jaws can be adjusted relative to each other and to the saw teeth regardless of their size and the file, and the feed device can be set for saws in which the teeth vary in size, thus enabling the teeth to be properly filed and set simultaneously. The setting device can be rendered inactive, when the saw is to be filed only, and if it is desired to set without filing, this can be done by removing the file carrier from its supporting slide head.

I claim as my invention:—

1. The combination of a support for the saw, a main frame, a head mounted to slide vertically on the main frame, a file carrier mounted to slide horizontally in ways on said vertically sliding head, a file secured on said file carrier, a drive shaft, and operating connections between said drive shaft and file carrier for horizontally reciprocating said file carrier and also raising and lowering the slide head through the medium of the file carrier, substantially as set forth.

2. The combination of a support for the saw, a file, a file carrier mounted to reciprocate horizontally and vertically and having oppositely-disposed teeth, a rotary shaft, and a part secured to said shaft and having teeth which travel in a circular path of a diameter greater than the distance between the sets of teeth on the file carrier, and which coöperate with said teeth on the file carrier to reciprocate the same horizontally and also raise and lower the file carrier, substantially as set forth.

3. The combination of a support for the saw, a file, a file carrier mounted to reciprocate horizontally and vertically and having an opening provided at its upper and lower sides with teeth, a rotary drive shaft, an arm secured to said shaft adjacent to said file carrier and having teeth which project into said opening in the file carrier constructed and arranged to reciprocate said file carrier horizontally and vertically, substantially as set forth.

4. The combination of a support for the saw, a file, a file carrier movably mounted and provided with oppositely-disposed teeth, and a rotary operating device having teeth which engage the teeth on the file carrier and move in a circular path of greater diameter than the distance between the teeth on the file carrier, whereby the latter is reciprocated in two directions at an angle to each other, substantially as set forth.

5. The combination of a support for the saw, filing mechanism, setting levers, feed mechanism for the saw, means for adjusting the filing and setting levers laterally relative to the saw blade, means for adjusting the setting levers relative to the filing mechanism, to the saw teeth and to each other, and means for adjusting the feed mechanism relative to the filing mechanism, substantially as set forth.

6. The combination of a support for the saw, a file, a reciprocating file carrier, a drive shaft, operating connections between said drive shaft and file carrier, setting levers, a wheel driven by said drive shaft and provided with a crank pin, an operating lever for said setting levers connected to said crank pin, a feed pawl which engages with the saw teeth, an operating lever for said pawl, and two studs carried by said wheel and which engage said pawl operating lever to move said pawl twice for each rotation of said wheel, substantially as set forth.

Witness my hand this 26th day of May, 1904.

SOLOMON D. BENOLIEL.

Witnesses:
J. C. BREWSTER,
ROBT. D. McINTYRE.